United States Patent [19]

Schulze

[11] 3,917,505
[45] Nov. 4, 1975

[54] APPARATUS FOR STACKING AND CONVEYING SHEET-LIKE SECTIONS

[76] Inventor: Ehrhart Schulze, Konigsberger Strasse 11, 7012 Fellbach-Schmiden, Germany

[22] Filed: Jan. 14, 1974

[21] Appl. No.: 432,845

[30] Foreign Application Priority Data
Jan. 19, 1973  Germany............................ 2302477

[52] U.S. Cl. .................. 156/515; 198/160; 83/409; 83/435.1; 83/435.2
[51] Int. Cl.² ....................................... B32B 31/00
[58] Field of Search ........... 198/160, 180, 218, 227, 198/37; 83/409, 412, 435.1, 435.2; 100/178

[56] References Cited
UNITED STATES PATENTS
2,711,020  6/1955  Hastings............................. 83/435.1
2,979,186  4/1961  Sehn et al........................... 198/160

Primary Examiner—Richard A. Schacher
Assistant Examiner—James M. Slattery
Attorney, Agent, or Firm—Hopgood, Calimafde, Kalil, Blaustein & Lieberman

[57] ABSTRACT

Apparatus for stacking and conveying sheet-like sections includes a plurality of conveyor belts arranged to move a stack of such sections from a stacking station adjacent to a machine which makes the sections to a delivery station. A carriage is provided which is movable in a direction parallel to the direction of motion of the conveyor belts. After a desired number of sections are stacked, pressing apparatus mounted on the carriage compresses the stack of sections to hold it in a stable configuration against at least one of the conveyor belts. The belt drive is then activated causing the stack, the pressing apparatus and the carriage to move with the conveyor belts. A projection on the carriage is arranged to activate a switch which stops the belt drive when the stack has reached a desired delivery station. The pressing apparatus is then released and a pneumatic piston returns the carriage to the stacking station.

10 Claims, 6 Drawing Figures

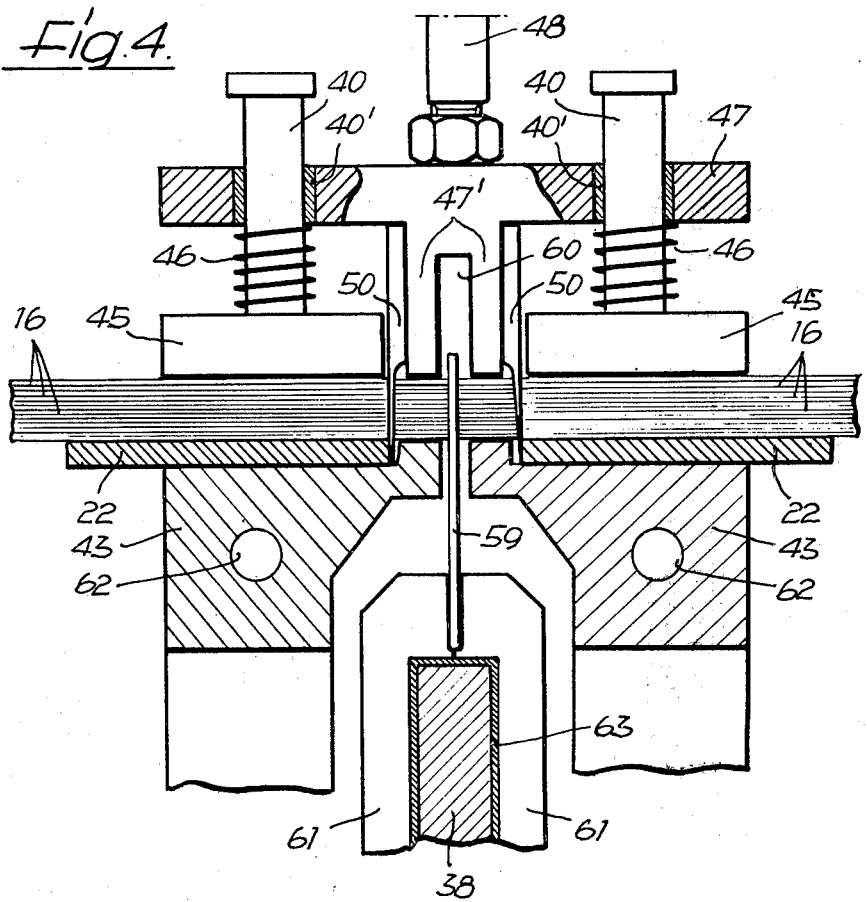

APPARATUS FOR STACKING AND CONVEYING SHEET-LIKE SECTIONS

BACKGROUND OF THE INVENTION

The present invention relates to apparatus for stacking and conveying sheet-like sections, and particularly to such apparatus for conveying plastic bags.

Known apparatus of this type includes a plurality of endless conveyor belts supported in a frame. The belts are movable along one direction of conveyance. The sheet-like sections are stacked on top of each other in a stacking station to form a flat pile at least one edge of which rests against a movable stop. After the stacking of a predetermined number of sections, a control device causes the movable stop to swing out of the path of the pile and connects drive means to the conveyor belts causing the belts to convey the flat pile of bags in the direction of conveyance from the stacking station into a delivery station.

Prior art apparatus of this type has the disadvantage that when the conveyor belts start in motion and convey the flat pile of bags, the bags contained in the pile can easily slip, so that the flat pile frequently arrives at the removal station with the bags no longer properly stacked on top of each other. This can lead to difficulties when the pile is removed at the delivery station.

In prior art bag making apparatus tubular sheet-like sections were cut within the machine before reaching the stacking station to form two webs which were moved apart at a point within the machine adjacent to a heat sealing device. This arrangement slowed the operation of the bag making machine and provided a more complex machine which was more prone to jamming and poor delivery of the finished bags.

The object of the invention is to provide an apparatus for the stacking and conveying of sheet like sections, such as folded bags so that a pile of said sections which are stacked against a stop in a stacking station can be conveyed to a delivery station in a manner so that the pile remains aligned during the conveyance.

SUMMARY OF THE INVENTION

The above object is accomplished in accordance with the present invention in the following manner.

Apparatus for stacking and conveying sheet-like sections includes a plurality of endless conveyor belts supported by support means attached to a first frame said belts being arranged so that they form a substantially planar support surface. At least one movable stop is arranged adjacent to the support surface of said belts and means are provided to stack sheet-like sections on the support surface so that the sections form a flat pile one side of which rests against the at least one stop. Drive means are provided which are adapted to move the belts in a given direction after a predetermined number of sheet-like sections have been stacked on the support surface. A carriage is movably supported on a second frame in a first position so that the carriage is movable in a direction parallel to said given direction. Pressing apparatus is mounted on the carriage and is movable in a plane which is substantially perpendicular to the support surface so that when activated the pressing apparatus compresses the pile of sheet-like sections against at least one of said belts causing said pile, the pressing apparatus and the carriage to move with said belt. Stopping means are arranged for deactivating the drive means to stop the belts when the pile has moved a predetermined distance and means responsive to said stopping means deactivates the pressing means and releases the pile. Additional means responsive to the stopping means returns the carriage to said first position.

One particular advantage of the apparatus in accordance with this invention is that during movement to the delivery station, the sheet-like sections of the flat pile are compressed firmly together by the pressing device so that this period of movement can be utilized to perform various functions on the flat stack. For instance, the flat stack can be moved past a glueing or heat-sealing device which glues or heat seals together the edges of the sheet-like sections of the flat pile which face the glueing or heat-sealing device. The flat pile can also be advanced past a tool, for instance a knife, in a manner such that as a result of the relative movement between the flat pile and the knife, the flat pile is provided with desired cuts. A heated knife can be used for cutting and, in the case of sheet-shaped sections of thermoplastic material, the heated knife can at the same time both cut the sheet sections and seal the completely cut parts of the flat pile to each other at the cut edges.

In another advantageous embodiment of the invention, the pressing apparatus can include a tool which is actuatable by the drive of the pressing apparatus, such as a punching or perforating apparatus. By use of such a tool associated with the pressing apparatus individual holes or lines of perforations can be produced at desired points through the flat stack at the same time as the pressing apparatus is moving into its pressing position.

DESCRIPTION OF THE DRAWINGS

In the following description an apparatus for manufacturing blocked flat stacks of flatly collapsed tubular sections such as plastic bags is described with reference to the drawings of an illustrative embodiment of the invention.

In the drawings:

FIG. 4 is an enlarged fragmentary view of a portion of FIG. 3 with the pressing apparatus in pressing position above the knife;

DESCRIPTION OF THE INVENTION

Figure 2:
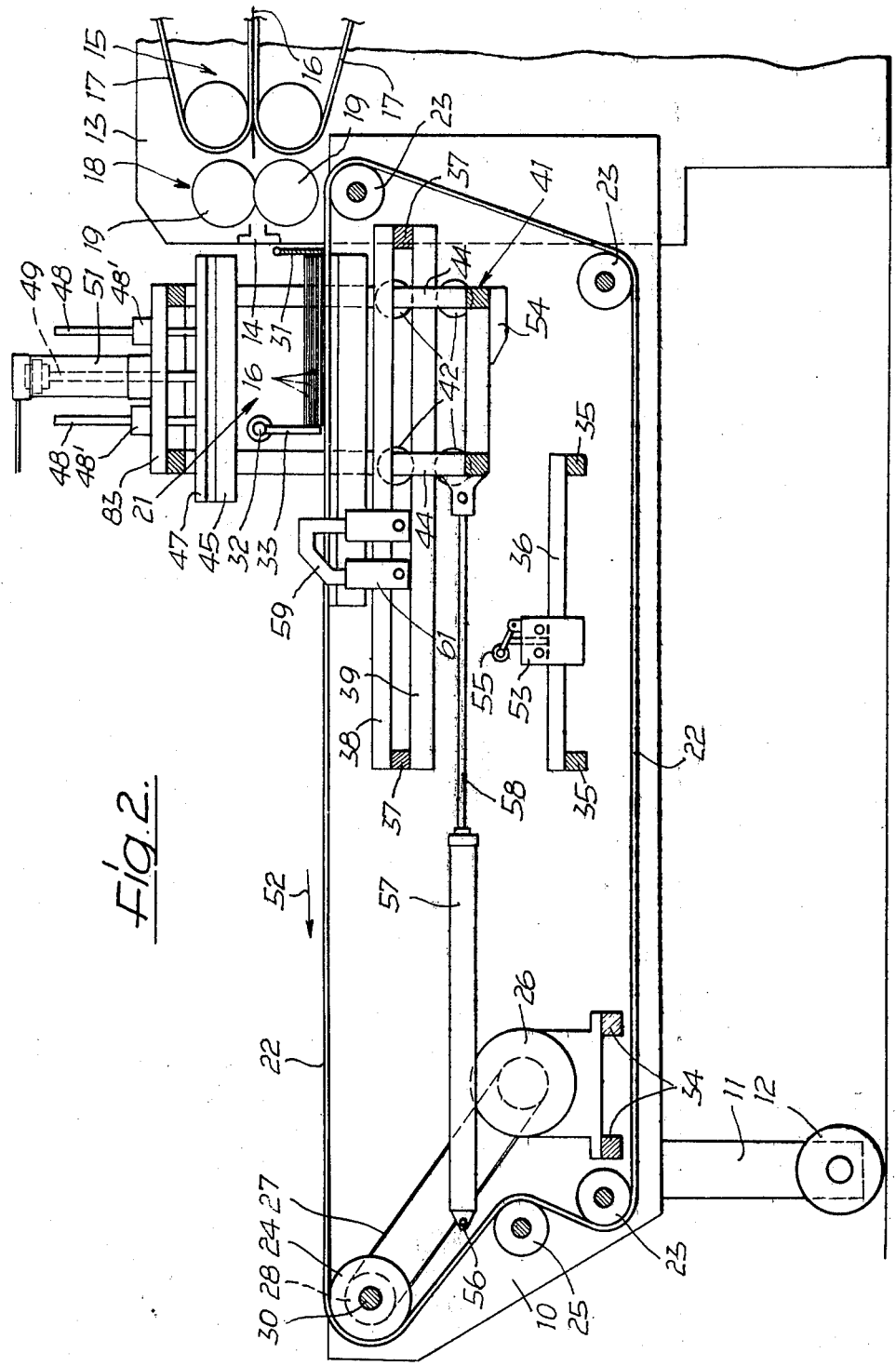
FIG. 2 is a sectional view taken along the plane II—II of FIG. 1 in a larger scale than FIG. 1.

The apparatus for the manufacture of blocked stacks of bags composed of thermoplastic resin sheet material is shown in the attached drawings. This apparatus includes a frame 10 which is supported at one end by two supporting feet 11. Rollers 12 are attached to the ends of feet 11 so that feet 11 can roll along the ground. The other end of the frame 10 is supported on a second frame 13 which is a part of an automatic bag manufacturing machine. Only the end of the bag making machine having the opening 14 through which bags are ejected for stacking is shown in FIG. 2. A belt conveyor system designated generally as 15 which conveys individual flatened tube sections 16 terminates at opening 14. This belt conveyor system 15 conveys the tubes 16 between adjacent courses of the two conveyor belts 17 so that tube sections 16 pass through a stabilizer 18 which comprises interengaging grooved discs 19. The tube section is slightly deformed upon emergence from the stabilizer 18 by grooves extending around discs 19 in the direction of conveyance. The flattened tubes are then thrown through the ejection opening 14 onto the stacking station designated generally as 21.

Figure 1:
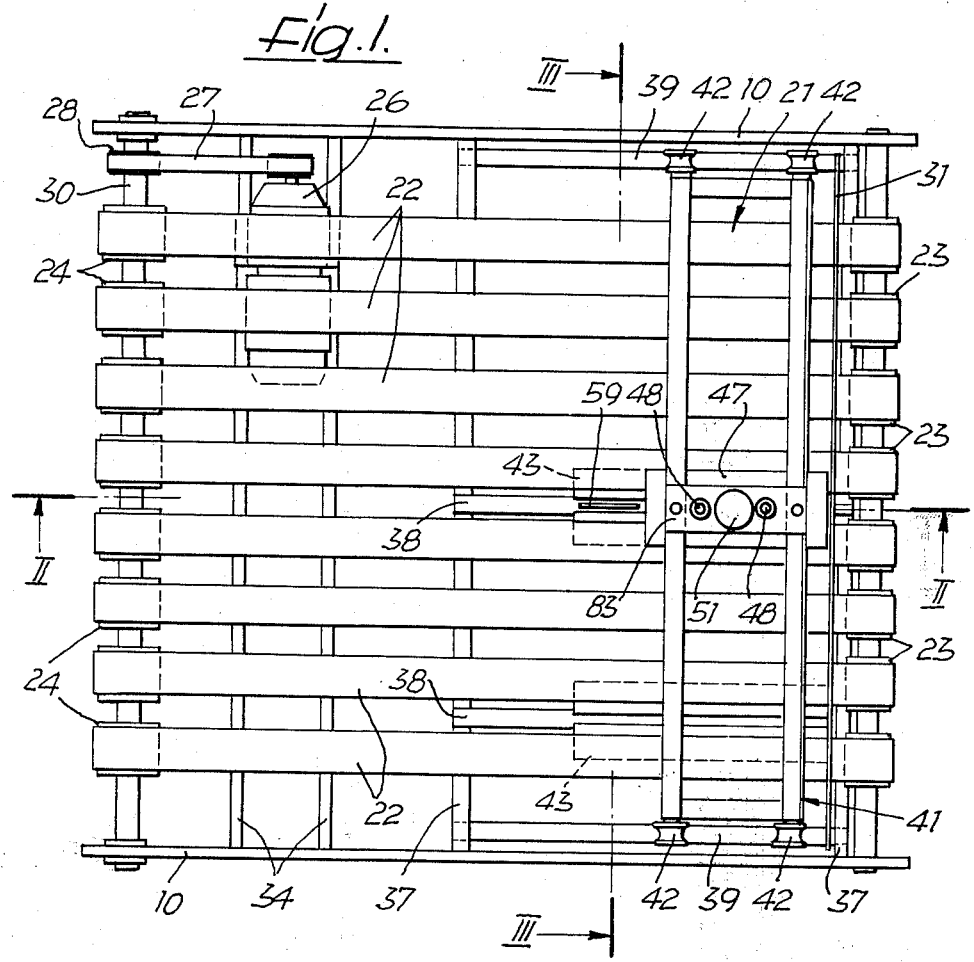
FIG. 1 is a top view of the apparatus.

As can be noted from FIG. 1, eight parallel endless conveyor belts 22 are provided within the frame 10. The belts 22 extend around deflection pulleys 23 which are rotatably supported in the frame 10. The belts 22 are also in contact with one drive pulley 24 each and each belt is tensioned by a tensioning roller 25. The drive pulleys 24 are fastened on a common drive shaft 30 which can, for instance, be driven by a self-braking motor 26 which is connected via a toothed belt 27 and a toothed disc 28 so that it rotates shaft 30 in counter-clockwise direction, as seen in FIG. 2.

The upper horizontally extending courses of the conveyor belts 22 form at the stacking station 21 a support surface for the stacking of tube sections 16 as they are ejected from the ejection opening 14 of the automatic bag manufacturing machine. The stacking station is limited on both sides by lateral stops 29, shown only in FIG. 3 and at the rear adjacent to the bag manufacturing machine by a fixed stop 31. Two front stops 33 as seen in FIG. 2 are fastened to a rotatably supported shaft 32. Shaft 32 is rotatable by 90° in clockwise direction from the position shown in FIG. 2 by a compressed air drive, not shown, so that stops 33 can be moved out of the path of the pile of tube sections 16.

In the frame 10 two cross members 34, as seen in FIG. 1, extend transversely to the direction of movement of the belts 22. Two additional transversely extending cross members 35, as seen in FIG. 2, support a bar 36 which is aligned in the direction of conveyance. Two other transversely extending cross members 37 which support two strips 38 extending in the direction of conveyance and also support rails 39 extending in the direction of conveyance along the side walls of the frame 10 as seen in FIG. 1.

Figure 3:
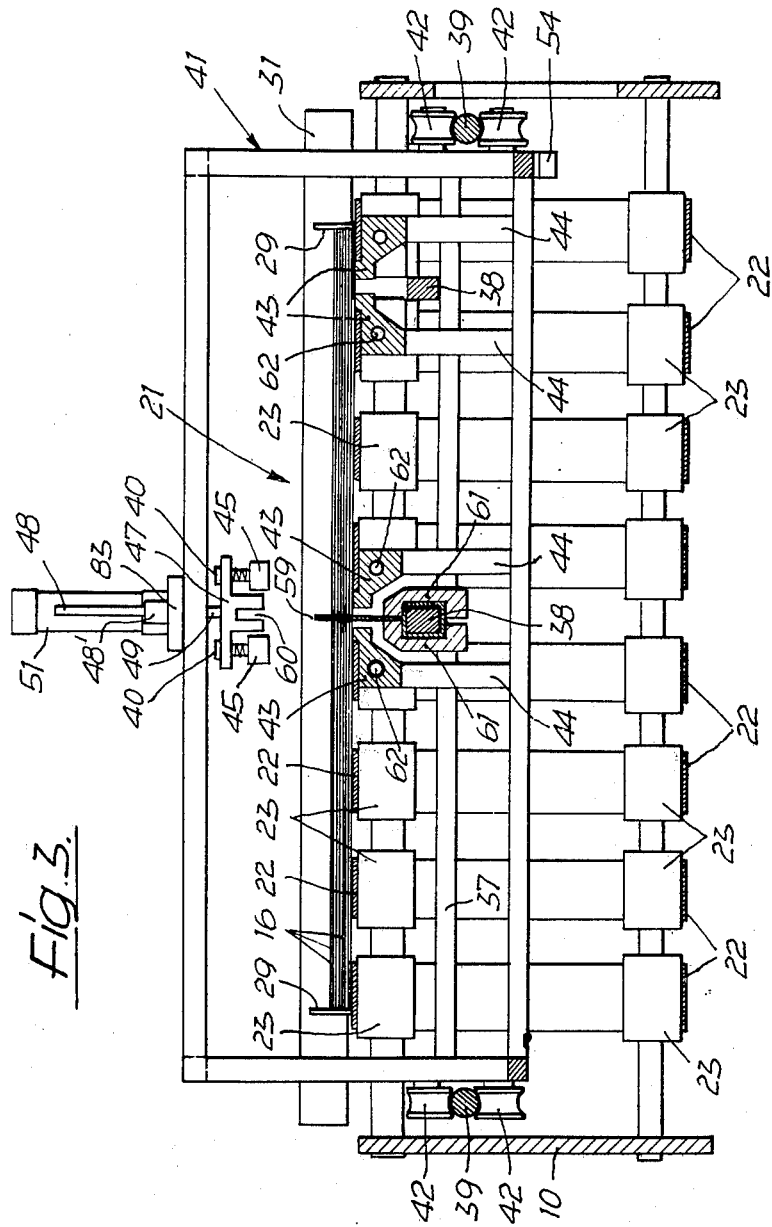
FIG. 3 is a sectional view taken along the plane III—III of FIG. 1 shown in a larger scale than FIG. 1.

The rails 39 serve as guides for a carriage designated generally as 41. The carriage 41 includes four rollers 42 on each side which are arranged in pairs above and below the rails 39 as seen in FIGS. 2 and 3. The carriage 41 is provided with two identical pairs of strip-shaped lower pressing jaws 43 shown in FIGS. 1 and 3 which extend in the direction of conveyance 52 and are arranged on supporting ledges 44 extending in the direction of conveyance directly below the two central conveyor belts 22.

A supporting plate 83 is detachable connected to carriage 41 and can be fastened optionally via either one of the two pairs of lower pressing jaws 43. To this supporting plate 83 there is connected a compressed air cylinder 51 as seen in FIG. 2 which serves as a press drive. The piston rod 49 of cylinder 51 is connected to a pressing member 47. The longitudinal axis of the pressing member 47 extends parallel to the direction of conveyance 52, indicated by an arrow in FIG. 2. The pressing member 47 as shown in detail in FIG. 4 is guided for movement up and down relative to the supporting plate 83 and perpendicular to the support surface of belts 22 by vertical guide columns 48 as seen in FIG. 2 which are in turn guided in guide bushings 48' mounted in the supporting plate 83.

Figure 5:
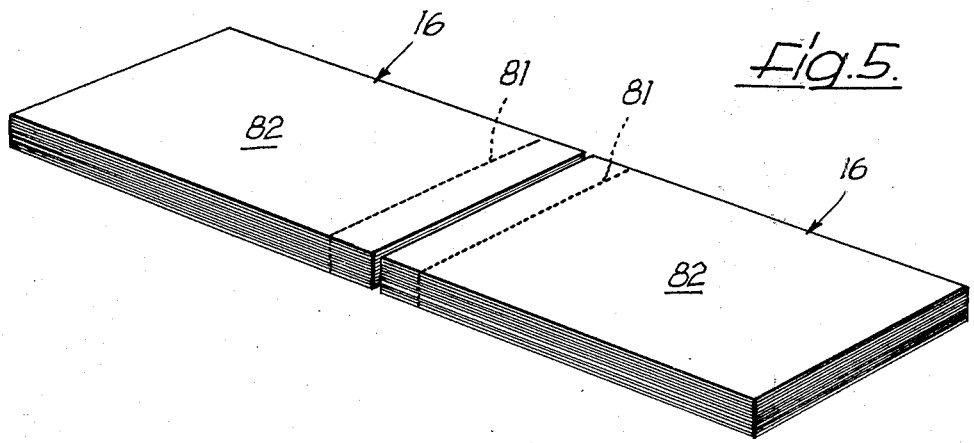
FIG. 5 is a perspective view of two blocked flat stacks of plastic bags as produced by the apparatus of FIGS. 1 through 4.

Guide pins 40 extend through bushings 40' of the pressing ledge as seen in FIG. 4. Two upper ledge-shaped pressing jaws 45 are mounted on guide pins 40 which are movable upward against the force of bias springs 46 which extend along pins 40 between jaws 45 and pressing member 47. The upper pressing jaws 45 are adapted in their alignment and arrangement to the pair of the lower pressing jaws 43. Between the upper pressing jaws 45, the pressing member 47 has a downwardly extending forked arm 47'. On each side of the forked sides of arm 47' there is fastened a perforating comb 50. By activating the piston 49 of the compressed air cylinder 51, the upper pressing jaws 45 can be moved out of the release position as shown in FIGS. 2 and 3 into the pressing position as shown in FIG. 4. The two perforation lines 81 which are parallel to each other as seen in the piles of bags 82 in FIG. 5 are produced in the flat stack upon the downward movement of the pressing apparatus 47 which causes the perforating combs 50 to puncture the piles of bags 82.

In the pressing position of the pressing apparatus 47 a stack of tube sections 16, stacked in the stacking station 21 are compressed between the lower pressing jaws 43 and the upper pressing jaws 45. Between the stack and the lower pressing jaws 43, the adjacent middle ones of the conveyor belts 22 are clamped. If the conveyor belts 22 are now driven in counter-clockwise direction as shown in FIG. 2 by the action of the self-braking motor 26 they will carry the entire carriage 41 and pressing apparatus 47 along with them to move them in the direction of conveyance 52 toward a delivery station.

In order to fix the position of this delivery station, there is arranged along the strip 36 an adjustable limit switch 53 which cooperates with a control projection 54 provided on the carriage 41 as seen in FIG. 2. As soon as the control projection 54 depresses an actuating lever 55 of the limit switch 53 a normally closed contact is opened disconnecting the drive power from self-braking motor 26 which in turn causes the conveyor belts 22 to be immediately braked. A second compressed air cylinder 57 in FIG. 2 is mounted on the frame 10 by shaft 56. In order to move the carriage 41 from the delivery station back into the stacking station 21, this second compressed air cylinder 57 includes a piston rod 58 connected to the carriage 41. When extended rod 58 causes carriage 41 to move in a direction opposite to the conveyance direction 52 back to the stacking station 21.

A knife 59 is optionally provided which can be be connected by means of two pairs of clamping pieces 61 to either of the strips 38 at a selected point between the stacking station and the delivery station. The two pairs of clamping pieces 61 are provided with clamps for making electrical connection to provide electrical current for heating the knife 59. As can best be seen in FIG. 4, the knife 59 passes between the lower two pressing jaws 43. In order to prevent these lower pressing jaws 43 from being heated by the knife 59, the pressing jaws 43 are provided with water cooling by water circulating through bore holes 62. Each of the strips 38 is electrically insulated from the clamping pieces 61 by an insulator 63. The pressing apparatus 47 has a slot 60 separating the forked arms 47' extending in the direction of conveyance 52, which permits the knife 59 to pass between the perforating combs 50.

Figure 6:
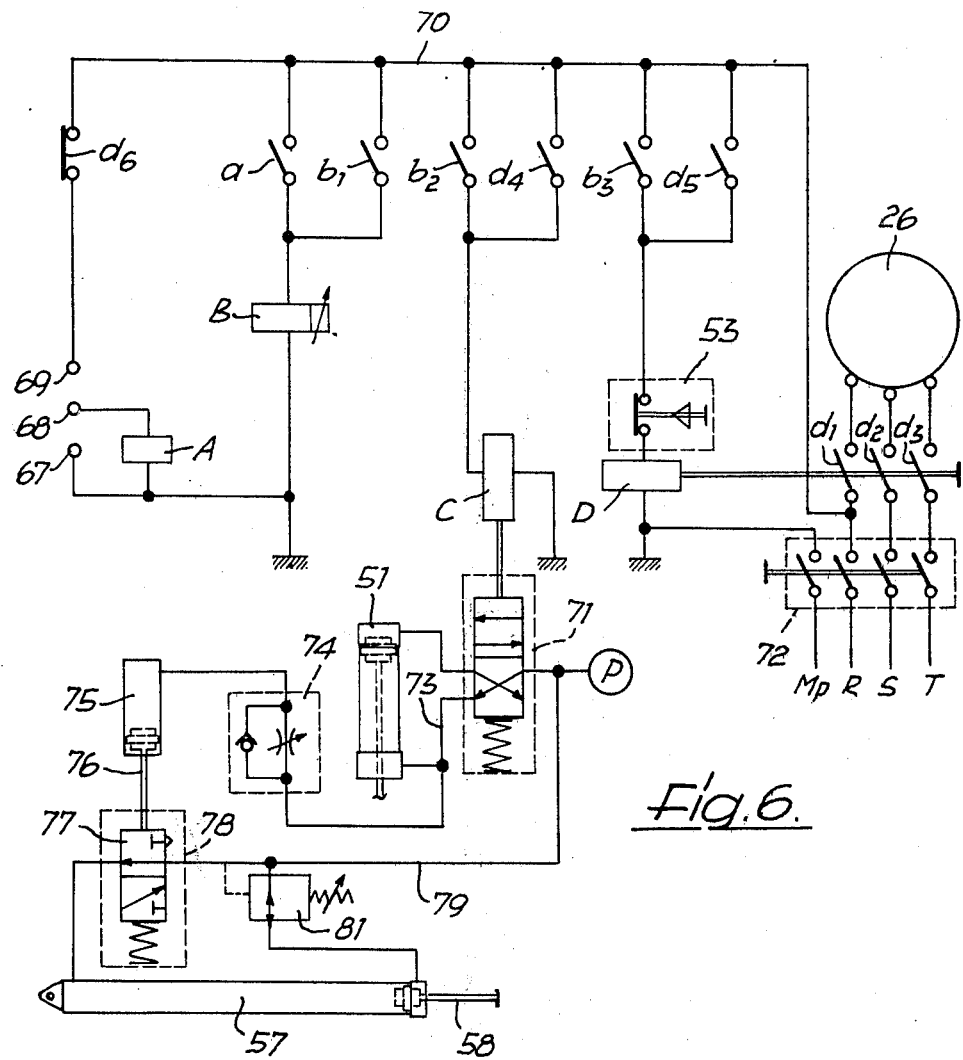
FIG. 6 is a schematic diagram of an electropneumatic control circuit for the apparatus shown in FIGS. 1 to 4 which is in the condition existing immediately before the start of the next operating cycle.

The construction of the control device for the apparatus shown in FIGS. 1 to 4 is shown schematically in FIG. 6 as a combined electropneumatic circuit.

The start of an operating cycle of the apparatus is effected by a short pulse emitted by a counter connected to the automatic bag manufacturing machine, which counter is not shown in the drawings. This counter in the bag manufacturing machine may be activated as described below. When the first flat end-sealed tube section 16 of each stack has been completed in the automatic bag manufacturing machine, a cam within the machine has turned once, briefly actuating a limit sensor. The limit sensor activates a subtractive counter which counts back by one from a preset number as each tube section is made and gives off a brief electric pulse to stop the bag making machine when it reaches zero. The preset number is chosen to provide a desired number of bags in each stack.

The electric circuit of the control device shown in FIG. 6 has three connecting terminals. One terminal 67 connects to a common ground for the automatic bag manufacturing machine and of the stacking and conveying apparatus in accordance with FIGS. 1 to 4. Terminal 68 is connected to receive the input signal given off by the counter of the automatic bag manufacturing machine when it reaches zero as described above and commences an operating cycle of the stacking and conveying apparatus when the number of tube sections 16 for which the counter of the automatic bag manufacturing machine has been set has been delivered from the automatic bag manufacturing machine. Terminal 69 is connected to the bag manufacturing machine and provides a signal from the stacking and conveying apparatus that the bag manufacturing machine can eject further bags to start another stack.

The terminal 68 is connected to a relay A which has a closing contact connected in the feed circuit of a time delay relay B. The time delay relay B has a closing contact $b_1$ which is immediately actuatable upon the exciting of the coil of the relay B and which provides a holding contact which opens after a period of time $t_1$. The relay B also includes two closing contacts $b_2$ and $b_3$ which close upon the exciting of the coil of the relay B for time periods $t_2$ and $t_3$, respectively. The times $t$ are so selected that $t_1$ is longer than $t_3$ and $t_3$ is longer than $t_2$.

The closing contact $b_2$ is connected in the feed circuit of a relay C which is provided for actuating the compressed air valve 71 which in turn actuates the compressed air cylinder 51.

The closing contact $b_3$ is connected in series with the opening contact of the switch 53 and with the feed circuit of a relay D which is provided for the connecting of the self-braking motor 26. For this purpose, the relay D includes three closing contacts $d_1$, $d_2$, $d_3$ for the three phases R, S and T of a three-phase current network of motor 26. Two additional closing contacts $d_4$ and $d_5$ are connected as holding contacts for the relays C and D in parallel with the contacts $b_2$ and $b_3$. The opening contact $d_6$ closes upon the de-energizing of the relay D and thereby via the connecting terminal 69, provides the signal to the automatic bag manufacturing machine to begin the ejection of further tube sections 16 for the next pile. A main switch 72 is provided for the connecting of the blocking apparatus to the three-phase current network.

The pneumatic circuit shown in FIG. 6 includes the aforementioned compressed air valve 71 which serves optionally to feed compressed air from a source of compressed air P to the lower or to the upper cylinder chamber of the compressed air cylinder 51 and to take the air from the other chamber of cylinder 51. FIG. 6 shows the position of the compressed air valve 71 when the coil of the rely C is de-energized, the compressed air being fed from the compressed air valve 71 via a conduit 73 to the lower cylinder chamber of the compressed air cylinder 51, so that the cylinder 51 holds the pressing apparatus of the carriage 40 formed by the pressing jaws 43 and 45 in its released position. The conduit 73 is connected via an adjustable throttle 74 with a compressed air cylinder 75. The piston rod 76 of cylinder 75 is connected with the slide 77 of a compressed air valve 78. The valve 78 controls the supply of compressed air to the compressed air cylinder 57. The piston rod 58 of cylinder 57 returns carriage 41 from the delivery station to the stacking station. The conduit 79 which connects the valve 78 with the source of compressed air P is connected via a pressure reduction valve 81 with the chamber of the compressed air cylinder 57 to facilitate the feed stroke of the carriage 41, by which the stack is moved to the delivery station. The compressed air passing through the reduction valve 81 thereby aids in moving the carriage 41 in direction 52.

The manner of operation of the stacking and conveying apparatus described above is as follows, as can be noted from the above:

From the ejection opening 14 of the automatic bag manufacturing machine, flatly compressed tube sections 16 which are heat-sealed at their two ends extending transversely to the longitudinal axis of the tube are ejected onto the stacking station 21 where they are stacked to form a flat pile which is defined by stops 29, 31 and 33. As soon as a predetermined number of tube sections 16 as set in the counter within the automatic bag manufacturing machine has been delivered to the stacking station 21 the automatic bag manufacturing machine disconnects and emits a signal to the blocking apparatus through terminal 68. The coil of the relay A is briefly excited by this signal, so that the contact of this relay closes for a short time. This in turn causes the coil of the time delay relay B to be energized. The coil relay B is held in this energized condition for the period of time $t_1$ by the holding contact $b_1$. After the expiration of a period of time $t_2$ which provides time for the last tube length 16 of that stack to be thrown out of the automatic bag manufacturing machine and to reach the stack in the stack station 21, the contact $b_2$ of the time delay relay B closes. The closing of contact $b_2$ energizes the coil of the relay C. Relay C then moves the compressed air valve 71 from the position shown in FIG. 6, in which the lower cylinder chamber of the compressed air cylinder 51 is connected to source of compressed air P into a position in which the upper cylinder chamber of the compressed air cylinder 51 is connected to the source of compressed air P. When relay C is deactivated a bias spring returns valve 71 to the position shown in FIG. 6. The piston of the compressed air cylinder 51 moves downward when air is supplied to the upper end of the cylinder causing the pressing apparatus formed by the pressing jaws 43 and 45 to move into their pressing position, so that the stack is compressed firmly between the pressing jaws 43 and 45 with the interposed central conveyor belts 22 held firmly between them and against the stack. At the same time, the individual tines of the perforating combs 50 penetrate the stack to produce two lines of perforations 81 parallel to each other, which are shown by the dashed line in FIG. 5. The switching of the compressed air valve 71 activates the compressed air drive (not shown) of the shaft 32 so that shaft 32 is turned 90° in a counter-clockwise direction. The stop 33 is thereby swung into its released position which is out of the path of the stack. After the time $t_3$ the delayed contact $b_3$ of the relay B closes. Time $t_3$ is chosen so that this contact $b_3$ closes as soon as the pressing apparatus has been switched into its pressing position. By closing the contact $b_3$, the relay D is energized via the contact of the limit switch 53. As a result, the closing contacts $d_1$, $d_2$ and $d_3$ close, so that the self-braking motor 26 is placed in operation and the conveyor belts 22 are moved in counter-clockwise direction causing the stack to move in direction 52. At the same time, contacts $d_4$ and $d_5$ of relay D are closed. Contacts $d_4$ and $d_5$ are connected as holding contacts for relays C and D. The time $t_1$ after which the holding contact $b_1$ of relay B disconnects is chosen so that this contact opens and thereby deactivates the relay B after the holding contacts $d_4$ and $d_5$ have closed.

The entire carriage 41 is moved in the direction of conveyance 52 by the central conveyor belts 22, the knife 59 is positioned so that it cuts through the flat pile of bags between the two perforation lines 81. During this cutting the heat of knife 59 seals together the edges of the bags facing the knife 59. This results in two piles of bags 82 as shown in FIG. 5. As soon as the flat pile has moved past the knife 59, the actuating lever 55 of the limit switch 53 is actuated by the control projection 54 on the bottom of the carriage 41 so that the switch 53 is opened. As a result, the coil of the relay D is de-energized and the self-braking motor 26 is disconnected, which causes the conveyor belts 22 to be braked and the carriage is held fast in the delivery station. At the same time, the holding contacts $d_4$ and $d_5$ also open. Due to the opening of the holding contact $d_4$, the coil of the relay C is de-energized and the valve 71 is thereby switched into the position shown in FIG. 6, in which the lower cylinder chamber of the compressed air cylinder 51 is acted on by compressed air. This results in the pressing apparatus being switched into its release position freeing the stack. Due to the switching of the valve 71 the shaft 32 rotates back to its original position and the attached stop 33 is again swung back into the stop position shown in FIG. 2. At the same time, the compressed air cylinder 75 is actuated by compressed air from source P through conduit 73 and throttle 74. The piston rod 76 of the valve 75 moves slowly downward. This motion causes the valve 78 to be slowly reversed. The throttle 74 can be so adjusted so that the valve 78 will be switched only after the pressing apparatus has been placed in its released position. The carriage which has now been released is pushed by shaft 58 of the compressed air cylinder 57 out of the delivery station into the stacking station when the shaft 58 is caused to move by compressed air supplied by source P through conduit 79.

Simultaneously with the disconnecting of the self-braking motor 26 upon the de-energizing of the relay D, the contact $d_6$ of relay D closes, thereby connecting terminal 69 through wire 70 with phase R of the main switch 72 to provide a voltage which reactivates the automatic bag manufacturing machine for the further delivery of tube sections 16.

In the delivery station, the two piles 82 which consist of tube part sections which are heat-sealed together along the side adjoining the perforation lines 81 can now be removed. By the separating of the individual tube part sections at the perforation line 81, individual fnished bags are then obtained.

If desired, the knife 59 can be fastened on the second strip 38 as shown at the right side of FIG. 3 and the compressed air cylinder 51 arranged over this strip by mounting it on the right side of the carriage 41. By this arrangement only a narrow strip of the flat stack is separated at one end, so that after the separating of this strip, a stack of long bags is produced. The individual bags are then torn off along the single perforation line thus produced from the blocked stack.

The apparatus described can also be used with an unheated knife 51. In that case, two stacks of bags piled loosely one upon the other are produced. In this arrangement the perforation combs 50 can be omitted.

Instead of the perforation comb 50, some other tool can also be provided for working the flat stack, for instance a perforating device for perforating the edge of the bag. This may be of interest in particular if the flat stack is cut through by an unheated knife 59 and it is desired that the edge of the bag opening be perforated.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A machine for cutting sheets comprising
   a frame;
   conveying means mounted on said frame for moving a stack of said sheets from a first position to a second position spaced a predetermined longitudinal distance from said first position;
   stop means adjacent to said first position for locating on one side of said conveying means a stack of said sheets to be cut;
   a movable carriage supported by said frame and arranged to guide said stack longitudinally between said first and second positions;
   stack pressing means mounted on said carriage, said stack pressing means including at least two opposed pairs of laterally spaced pressing members, said pairs of pressing members being arranged to span said stack and said conveying means at said first position;
   first means for activating said stack pressing means to cause said pairs of pressing members to compress said stack of sheets against said conveying means;
   second means to activate said conveying means to advance said compressed stack of sheets from said first position to said second position and
   cutting means mounted on said frame so that said cutting means extends into the path of said compressed stack in the space between said first and said second positions for cutting said stack of sheets as said stack is conveyed from said first station to said second station, said cutting means being arranged to pass between said laterally spaced pairs of pressing members.

2. A machine for cutting sheets as claimed in claim 1 in which said conveying means includes a number of endless belts said belts being arranged to provide a planar bearing surface extending between said first and said second positions and said cutting means being a knife fixedly mounted on said frame and arranged to extend through said planar bearing surface between the longitudinal sides of two adjacent ones of said endless belts.

3. A machine for cutting sheets as claimed in claim 1 in which hole punching means are attached to said stack pressing means said hole punching means being arranged to create at least one aperture extending through said stack of sheets.

4. A machine for cutting sheets as claimed in claim 1 including means to heat said cutting means.

5. A machine for cutting sheets according to claim 1 including switch means activated by said carriage; first means responsive to said switch means for deactivating said conveying means when said carriage has moved into said second position; and second means responsive to said switch means for deactivating said pressing means when said carriage has moved into said second position to release said stack of sheets.

6. A machine for cutting sheets according to claim 5, in which said switch means is fixedly mounted on said frame, and includes a projecting activating lever; and said carriage includes a projection arranged to cooperate with said activating lever when said carriage moves from said first to said second position.

7. A machine for cutting sheets according to claim 5, including third means responsive to said switch means to return said carriage to said first position.

8. A sheet-cutting machine according to claim 1 including control means responsive to the stacking of the predetermined number of said sheets on said conveying means to activate said first means to compress said stack and to activate said second means to advance said stack from said first to said second positions; delay means responsive to said control means to delay the activation of said second means for a predetermined time period after the activation of said first means.

9. A machine for cutting sheets comprising
a frame;
a plurality of endless conveyor belts mounted on rollers attached to said frame, said belts being arranged to provide a planar bearing surface extending between a first and a second longitudinally spaced positions;
a movable carriage supported by said frame and arranged to guide said stack of sheets from said first position to said second position;
stack pressing means mounted on said carriage including two pairs of pressing members; each of said pairs of pressing members including an upper pressing member and a lower pressing member, said lower pressing members being fixedly mounted on said carriage so that one of said lower pressing members is arranged respectively at least partially beneath each of two adjacent ones of said endless belts and said upper pressing members of each said pair is mounted on said carriage substantially perpendicularly above the lower pressing member of said pair at a vertical height above said bearing surface which is greater then the vertical height of said stack, and said upper pressing members are movable in a direction substantially perpendicular to said bearing surface;
means to activate said upper pressing members of said pressing means to cause said upper pressing members to compress said stack of sheets against said bearing surface;
means to activate said endless belts to advance said compressed stack of sheets and said carriage from said first position to said second position; and
cutting means fixedly mounted on said frame so that said cutting means extends through said bearing surface between the adjacent longitudinal sides of said two adjacent endless belts and into the path of said compressed stack in the space between said first and said second positions for cutting said stack of sheets as said stack if conveyed from said first station to said second station, said cutting means being arranged to pass between said pairs of pressing members.

10. A machine for cutting sheets according to claim 9 in which each of said upper and lower pressing members include an elongated pressing surface, the longer axis of said elongated pressing surfaces being substantially parallel to the direction of motion of said surface from said first to said second position and said cutting means being arranged to pass between said elongated pressing surfaces of said pairs of pressing members.

* * * * *